United States Patent
Riff et al.

(10) Patent No.: US 11,760,571 B2
(45) Date of Patent: Sep. 19, 2023

(54) AUTOMATED LABORATORY SYSTEM AND RELATED SYSTEMS, METHODS, AND DEVICES

(71) Applicant: Thermo CRS Ltd., Burlington (CA)

(72) Inventors: Michael Paul Riff, Burlington (CA); Jonathan Wittchen, Burlington (CA); Gary Darnel, Hamilton (CA); Stephen Wayne Johnson, Waterdown (CA)

(73) Assignee: THERMO CRS LTD., Ontario (CA)

( * ) Notice: Subject to any disclaimer, the term of this patent is extended or adjusted under 35 U.S.C. 154(b) by 1050 days.

(21) Appl. No.: 16/523,329

(22) Filed: Jul. 26, 2019

(65) Prior Publication Data

US 2021/0024289 A1    Jan. 28, 2021

(51) Int. Cl.
  *B65G 1/137*  (2006.01)
  *G01N 35/00*  (2006.01)
  *B01L 9/02*  (2006.01)

(52) U.S. Cl.
  CPC .............. *B65G 1/137* (2013.01); *B01L 9/02* (2013.01); *G01N 35/0099* (2013.01);
  (Continued)

(58) Field of Classification Search
  CPC .... B65G 1/137; G01N 35/04; G01N 35/0099; G01N 2035/0465; B01L 9/02;
  (Continued)

(56) References Cited

U.S. PATENT DOCUMENTS 5,681,530 A * 10/1997 Kuster ............... G01N 35/0099
  422/63
5,972,295 A * 10/1999 Hanawa ............... G01N 35/026
  422/65
(Continued)

FOREIGN PATENT DOCUMENTS

WO    9826746 A2    6/1998

OTHER PUBLICATIONS

International Search Authority, Canadian Intellectual Property Office, International Search Report and Written Opinion Bsued in related PCT Application No. PCT/2019CA/050130, dated Apr. 17, 2019 (11 pages).
(Continued)

*Primary Examiner* — Shogo Sasaki
(74) *Attorney, Agent, or Firm* — Michael Best & Friedrich LLP

(57) ABSTRACT

An automated laboratory system includes a storage system including a frame and a platform slidably mounted to the frame such that the platform is slidable relative to the frame between a docked position and an undocked position, the platform being configured to carry an instrument. The system also includes a robotic device proximate the storage system and being configured to access the instrument carried by the platform. Another automated laboratory system includes a storage system including a table and a tabletop having a central axis and being rotatably positioned on the table such that the tabletop is rotatable about the central axis
(Continued)

between a docked position and an undocked position, the tabletop being configured to carry an instrument. The system also includes a robotic device proximate the storage system and being configured to access the instrument carried by the tabletop.

20 Claims, 14 Drawing Sheets

(52) U.S. Cl.
CPC .. *G01N 35/00584* (2013.01); *B01L 2200/025* (2013.01); *B01L 2200/087* (2013.01); *B01L 2200/14* (2013.01); *B01L 2300/0627* (2013.01)

(58) Field of Classification Search
CPC ....... B01L 2300/0803; B01L 2200/141; B01L 2200/087; B01L 2200/025; B01L 2200/14; B01L 2300/0627
See application file for complete search history.

(56) References Cited

U.S. PATENT DOCUMENTS

| | | | | |
|---|---|---|---|---|
| 6,071,477 | A * | 6/2000 | Auclair | G01N 35/04 235/375 |
| 7,407,627 | B1 * | 8/2008 | Rosenberg | G01N 35/025 422/65 |
| 9,039,992 | B2 * | 5/2015 | Fritchie | B04B 7/12 422/50 |
| 9,993,820 | B2 * | 6/2018 | Donohue | B01L 3/52 |
| 10,031,085 | B2 * | 7/2018 | Jakubowicz | B01L 3/50273 |
| 2004/0134750 | A1 * | 7/2004 | Luoma, II | G01N 35/04 198/340 |
| 2021/0024289 | A1 * | 1/2021 | Riff | B65G 1/137 |

OTHER PUBLICATIONS

Highres Biosolutions, CoLAB Flex Mobile, Modular Lab Automation, www.highresbio.com, 2018.

* cited by examiner

000
AUTOMATED LABORATORY SYSTEM AND RELATED SYSTEMS, METHODS, AND DEVICES

FIELD OF THE INVENTION

The present invention relates generally to laboratory systems and, more particularly, to automated laboratory systems for performing scientific processes such as assays.

BACKGROUND OF THE INVENTION

Conventional automated laboratory systems include one or more tabletops with a lab automation robot positioned thereon and a variety of instruments positioned on the one or more tabletops around the lab automation robot. The lab automation robot may be, for example, a selective compliance articulated robot arm (SCARA) type, and the instruments may include, for example, a liquid handler, an incubator, a reagent dispenser, a sealer, a microplate spectrophotometer, a thermocycler, a thermocycler controller, or any other suitable instrument for performing a desired scientific process such as an assay. In order to perform an assay, the robot may grip a microtiter plate containing samples and transfer the samples between the various instruments. In some instances, such as when space around the robot is limited, the robot may be placed on a horizontal track in order to increase the working envelope of the robot so that the robot may access instruments positioned on the tabletop along the track. In any event, conventional automated laboratory systems typically require a relatively large horizontal footprint. In particular, such systems require sufficient horizontal space to accommodate each of the robot and instruments. Thus, each automated laboratory system may leave little space in the laboratory for peripheral equipment, laboratory personnel, and/or other automated laboratory systems, for example. This may be particularly problematic for automated laboratory systems having a large number of instruments.

Conventional automated laboratory systems also fail to enable laboratory personnel to safely, conveniently, and efficiently access the various instruments of the system without compromising the performed assay.

Thus, it would be desirable to provide an improved automated laboratory system.

SUMMARY

In one embodiment, an automated laboratory system includes a storage system including a frame and at least one platform slidably mounted to the frame such that the at least one platform is slidable relative to the frame between a docked position and an undocked position, the at least one platform being configured to carry at least one instrument. The system also includes a robotic device proximate the storage system and being configured to access the at least one instrument carried by the at least one platform.

The system may also include at least one locking mechanism configured to lock the at least one platform against sliding relative to the frame when the at least one platform is in the docked position. The system may further include a main controller and at least one handle operatively coupled to the at least one platform. The at least one handle includes at least one body portion grippable by a user's hand for receiving a force exerted by the user's hand to move the platform between the docked position and the undocked position, at least one indicator for providing a discernible indication of a status of at least one of the at least one platform or the at least one instrument, and at least one sensor for detecting contact or proximity between the at least one handle and the user's hand. The system also includes a local controller in operative communication with the at least one locking mechanism, the at least one indicator, the at least one sensor, and the main controller. The local controller is configured to send an unlock signal to the at least one locking mechanism in response to the sensor detecting contact or proximity between the at least one handle and the user's hand for a predetermined amount of time, and the local controller is configured to send a request to the main controller to take the at least one instrument offline in response to the sensor detecting contact or proximity between the at least one handle and the user's hand for a predetermined amount of time. The main controller may be in operative communication with at least one of the robotic device or the at least one instrument.

In one embodiment, the at least one indicator includes at least one visual indicator for providing a visual indication of a status of at least one of the at least one platform or the at least one instrument. For example, the at least one visual indicator may include at least one light source. In addition or alternatively, the at least one indicator may include at least one tactile indicator for providing a tactile indication of a status of at least one of the at least one platform or the at least one instrument. For example, the at least one tactile indicator may include at least one vibration source.

In one embodiment, the at least one sensor includes at least one contact or proximity sensor. In addition or alternatively, the status may include at least one of an online status of the at least one instrument, an offline status of the at least one instrument, a transition between online and offline statuses of the at least one instrument, a docked status of the at least one platform, an undocked status of the at least one platform, or a transition between docked and undocked statuses of the at least one platform.

In another embodiment, an automated laboratory system includes a storage system including a table and at least one tabletop having a central axis and being rotatably positioned on the table such that the at least one tabletop is rotatable about the central axis between a docked position and an undocked position, the at least one tabletop being configured to carry at least one instrument. The system also includes a robotic device proximate the storage system and being configured to access the at least one instrument carried by the at least one tabletop.

The system may also include at least one locking mechanism configured to lock the at least one tabletop against rotation about the central axis when the at least one tabletop is in the docked position. The system may further include a main controller and at least one handle operatively coupled to the at least one tabletop. The at least one handle includes at least one body portion grippable by a user's hand for receiving a force exerted by the user's hand to move the tabletop between the docked position and the undocked position, at least one indicator for providing a discernible indication of a status of at least one of the at least one tabletop or the at least one instrument, and at least one sensor for detecting contact or proximity between the at least one handle and the user's hand. The system also includes a local controller in operative communication with the at least one locking mechanism, the at least one indicator, the at least one sensor, and the main controller. The local controller is configured to send an unlock signal to the at least one locking mechanism in response to the sensor detecting contact or proximity between the at least one handle and the user's hand for a predetermined amount of time, and the local controller is configured to send a request to the main controller to take the at least one instrument offline in response to the sensor detecting contact or proximity between the at least one handle and the user's hand for a predetermined amount of time. The main controller may be in operative communication with at least one of the robotic device or the at least one instrument.

In one embodiment, the at least one indicator includes at least one visual indicator for providing a visual indication of a status of at least one of the at least one tabletop or the at least one instrument. For example, the at least one visual indicator may include at least one light source. In addition or alternatively, the at least one indicator may include at least one tactile indicator for providing a tactile indication of a status of at least one of the at least one tabletop or the at least one instrument. For example, the at least one tactile indicator may include at least one vibration source.

In one embodiment, the at least one sensor includes at least one contact or proximity sensor. In addition or alternatively, the status may include at least one of an online status of the at least one instrument, an offline status of the at least one instrument, a transition between online and offline statuses of the at least one instrument, a docked status of the at least one tabletop, an undocked status of the at least one tabletop, or a transition between docked and undocked statuses of the at least one tabletop.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION OF THE INVENTION

Figure 1:
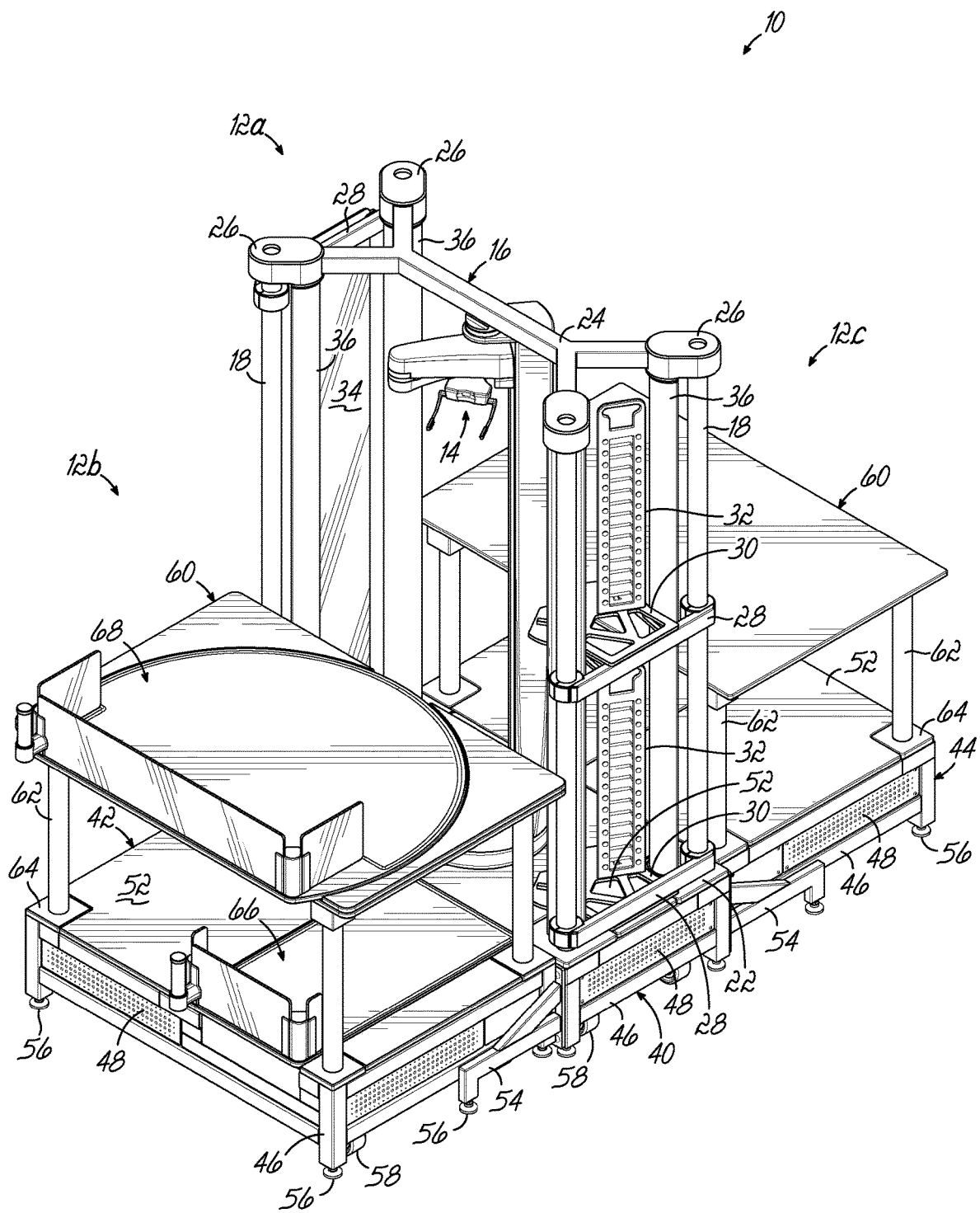
FIG. 1 is a perspective view of an exemplary automated laboratory system in accordance with an embodiment of the present invention.

With reference to FIG. 1, an exemplary automated laboratory system 10 including first, second, and third storage systems 12a, 12b, 12c for use with a robotic device 14 to perform at least one scientific process is shown in accordance with one embodiment of the present invention. The robotic device 14 may be a SCARA type robotic device, such as that sold by Thermo Fisher Scientific, Inc. under the trademark Spinnaker XT. Other types of robotic devices may be used, such as an articulated robotic device, a spider robotic device, or any other suitable types of robotic device. As set forth in further detail below, the automated laboratory system 10, including the storage systems 12a, 12b, 12c, provides a reduced horizontal footprint as compared to conventional automated laboratory systems, thereby allowing an increase in available space in the laboratory for peripheral equipment, laboratory personnel, and/or other automated laboratory systems, for example. The automated laboratory system 10 also enables laboratory personnel to safely, conveniently, and efficiently access various instruments (FIG. 15) carried by the storage systems 12a, 12b, 12c while minimizing the risk of compromising the performed assay. The features of the automated laboratory system 10 and storage systems 12a, 12b, 12c are set forth in further detail below to clarify each of these functional advantages and other benefits provided in this disclosure.

Further referring to FIG. 1, the illustrated first storage system 12a includes a frame 16 including at least one vertically extending post 18 which may be populated with one or more shelves (not shown) for carrying one or more scientific instruments (FIG. 15) or lab consumables, for example. In one embodiment, the shelves may be similar to those described in co-pending U.S. patent application Ser. No. 16/265,225, filed on Feb. 1, 2019, the content of which is incorporated by reference in its entirety. In the embodiment shown, four vertically extending posts 18 are arranged in a generally rectangular configuration such that the posts 18 may be circumferentially positioned about the robotic device 14, thereby providing the robotic device 14 with complete 360° access to the instruments carried by the optional shelves on the posts 18. In one embodiment, at least four posts 18 may be used. In addition or alternatively, the number of posts 18 may be selectively varied to contribute to a modularity of the storage system 12a. In any event, a foot 22 is provided at a lower end of each of the illustrated posts 18 for mounting the posts 18 in an upright position. In one embodiment, each post 18 may be integrally formed with the respective foot 22 as a unitary piece. Alternatively, each post 18 may be formed separately from the respective foot 22 and coupled thereto. For example, each post 18 may be received in a bore (not shown) of the respective foot 22 and secured to the frame foot 22 by suitable means.

In the embodiment shown, the posts 18 are operatively coupled to each other via a cross member 24 including a plurality of end caps 26 positioned over and fixed to the upper end of each of the posts 18 to assist in stabilizing the frame 16. For example, one or more fasteners (not shown) may couple each of the end caps 26 to the respective post 18. In addition or alternatively, each of the end caps 26 may be clamped over the respective post 18. As shown, one or more tie bars 28 may operatively couple adjacent posts 18 to each other along the lengths thereof, such as at or near the top ends, bottom ends and/or midpoints thereof. For example, one or more fasteners (not shown) may couple each of the tie bars 28 to the respective posts. In addition or alternatively, each of the tie bars 28 may be clamped over the respective posts 18. The tie bars 28 may be used to support additional components of the storage system 12*a*. For example, the tie bars 28 may support one or more hotel mounting platforms 30 for carrying one or more random access and/or sequential access stacks or hotels 32 for storing microtiter plates (not shown). In addition, or alternatively, the tie bars 28 may support one or more guard panels 34 for providing a barrier at or near the periphery of the frame 16.

As shown, a conduit 36 having a generally C-shaped cross section is positioned radially inwardly of, or behind, each of the posts 18. The end caps 26 of the cross member 24 may be positioned over and fixed to the upper end of each of the conduits 36. For example, a friction fit may be provided between each of the end caps 26 and respective conduits 36. In addition, or alternatively, the lower end of each conduit 36 may be coupled to the foot 22 of the corresponding post 18. In one embodiment, each conduit 36 may be integrally formed with the respective end cap 26 and/or respective foot 22 as a unitary piece.

The illustrated automated lab system 10 includes three decks 40, 42, 44 for supporting and/or housing various components of the automated lab system 10. In this regard, each deck 40, 42, 44 includes a deck frame 46 and a plurality of side cover plates 48 defining an at least partially enclosed interior space (not shown) for housing components of the automated lab system 10, such as one or more uninterruptable power supplies 50 (FIG. 9) for providing power to other components of the automated lab system 10, such as the robotic device 14 and/or instruments. In the embodiment shown, the cover plates 48 are perforated for venting the interior space to prevent the uninterruptable power supplies 50 from overheating. The cover plates 48 may be removable in order to provide access to the contents of the interior space. Each of the illustrated decks 40, 42, 44 includes one or more fixed platforms 52 positioned on the corresponding deck frame 46 for supporting various components of the automated lab system 10. In the embodiment shown, the center deck 40 includes outriggers 54 for assisting in stabilizing the deck 40 and components positioned thereon to prevent the deck 40 from tipping over. A plurality of leveling feet 56 are provided at lower ends of each of the deck frames 46 and/or outriggers 54 and are extendable therefrom and retractable thereinto for selectively adjusting the effective heights of the leveling feet 56. A plurality of casters 58 provided at or near lower ends of each of the deck frames 46 may assist in transporting the decks 40, 42, 44 across a surface such as a floor of a laboratory. In one embodiment, any or all of the decks 40, 42, 44 may be coupled together to form a single unit(s). In the embodiment shown, the platforms 52 of the center deck 40 and right-hand deck 44, as well as the left-hand platform 52 of the left-hand deck 42, are each fixed against movement relative to the respective deck frames 46. Alternatively, one or more of the platforms 52 may be movable relative to the respective deck frame(s) 46, as described below. For example, one or more of the platforms 52 may be linearly or rotatably movable relative to the respective deck frame 46.

In the embodiment shown, the first storage system 12*a* is positioned on the center deck 40, the second storage system 12*b* is positioned on the left-hand deck 42, and the third storage system 12*c* is positioned on the right-hand deck 44. In this regard, the feet 22 and/or lower ends of the posts 18 of the first storage system 12*a* may be received by and/or coupled to the deck frame 46 of the center deck 40, such as at or near the corners of the illustrated deck frame 46. The robotic device 14 is also positioned on the center deck 40 in a generally central location relative to the four posts 18 of the frame 16. One or more instruments may be positioned on the left-hand and/or right-hand deck(s) 42, 44 and/or on a table 60 thereof to elevate the instrument(s) placed thereon to a desired height such as for improved access by the robotic device 14. The illustrated tables 60 each include a plurality of table posts 62 terminating at feet 64 in a manner similar to the posts 18 and feet 22 of the first storage system 12*a*. In the embodiment shown, at least the right-hand table 60 is fixed against movement relative to the right-hand deck 44. Alternatively, at least a portion of one or more of the tables 60, such as a tabletop thereof, may be movable relative to the respective deck 42, 44, as described below. For example, a portion of one or more of the tables 60, such as a tabletop thereof, may be linearly or rotatably movable relative to the respective deck 42, 44 and/or table posts 62.

Figure 2:
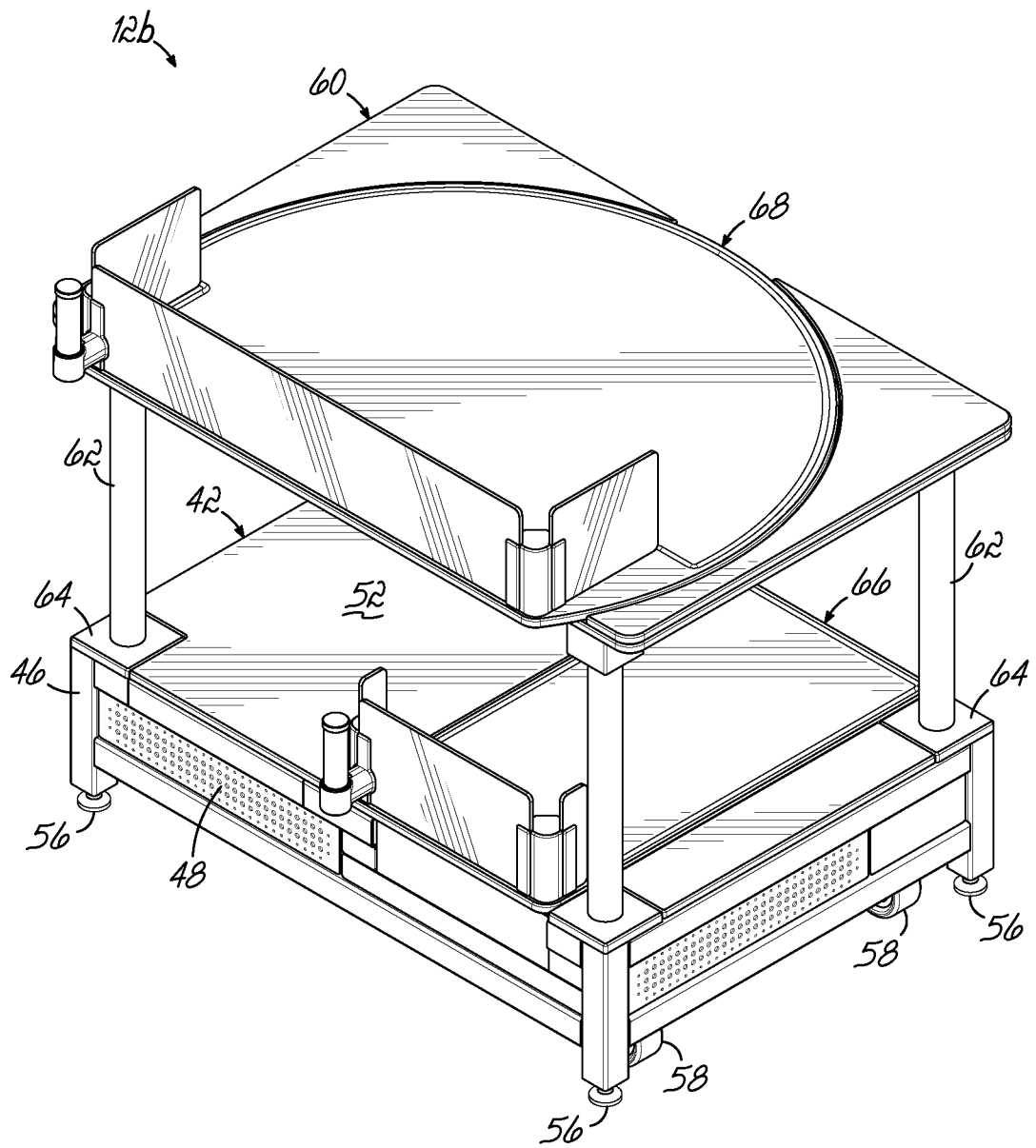
FIG. 2 is a perspective view of a storage system shown in FIG. 1.

In the illustrated embodiment, and as best shown in FIG. 2, the second storage system 12*b* includes at least one slidable platform 66 and at least one rotatable tabletop 68. More particularly, the left-hand deck 42 of the second storage system 12*b* includes the at least one slidable platform 66, and the table 60 of the left-hand deck 42 includes the at least one rotatable tabletop 68. The slidable platform 66 is attached to the right-hand side of the deck 42 in a linearly translating manner (e.g., similar to a drawer) and the rotatable tabletop 68 is positioned on top of the table 60 in a swiveling manner (e.g., similar to a turntable or Lazy Susan), as described in greater detail below.

Figure 3:
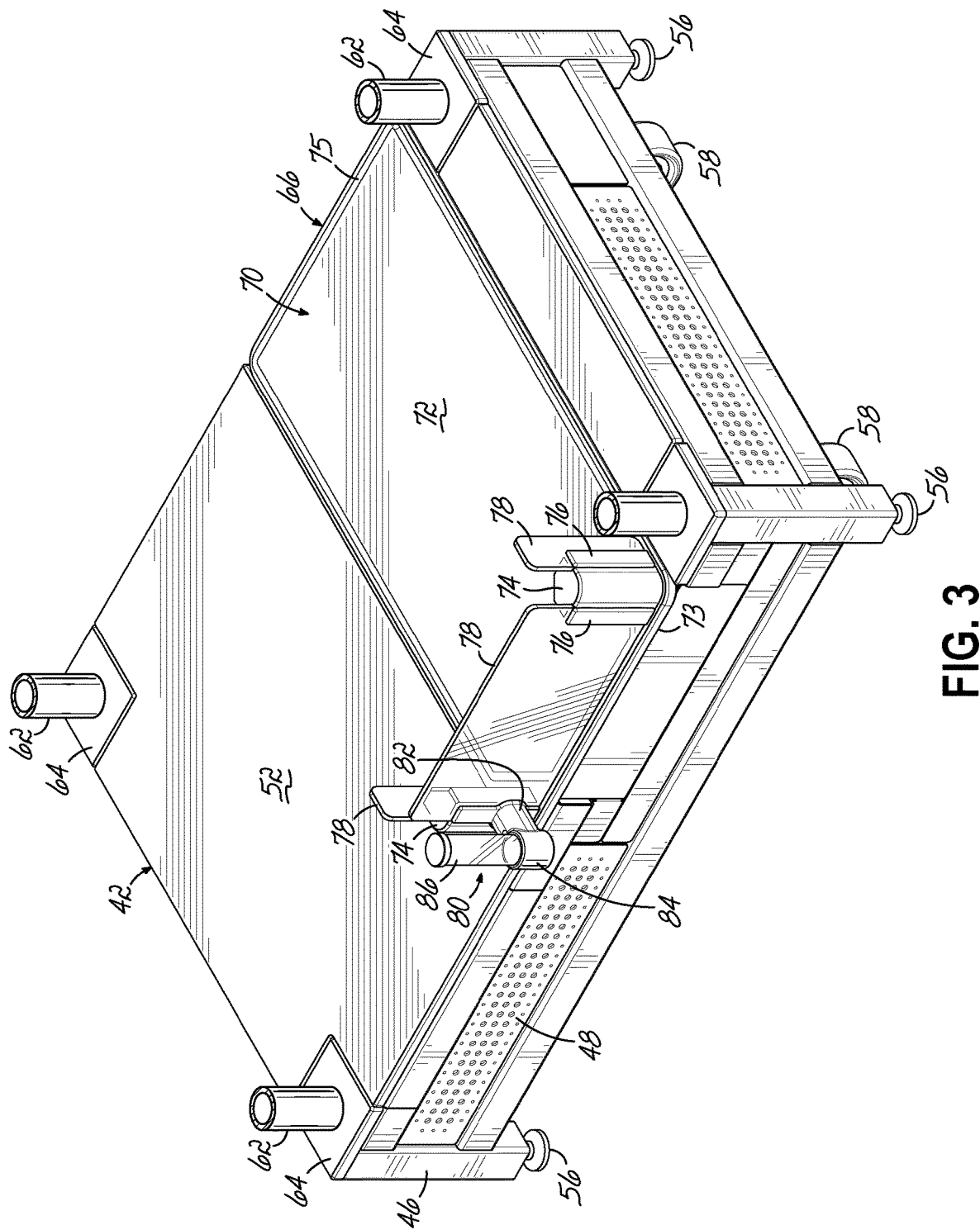
FIG. 3 is a perspective view of a lower portion of the storage system of FIG. 2, showing a slidable platform thereof.

Referring now to FIG. 3, and with continuing reference to FIGS. 1 and 2, the illustrated slidable platform 66 includes a tray 70 for carrying at least one instrument or lab consumable, for example. In this regard, the tray 70 includes a carrying surface 72 for receiving the corresponding instrument and a bottom surface 73 opposite the carrying surface 72. The tray 70 also includes a pair of pillars 74 extending upwardly from the carrying surface 72 at or near the front corners thereof and a spillway 75 extending downwardly from the carrying surface 72 at or near the periphery thereof in order to prevent liquids spilled onto the carrying surface 72 from leaking. The pillars 74 may be configured to support one or more clips or brackets 76 for supporting an object such as one or more guards 78 to provide a barrier at or near the periphery of the carrying surface 72 in order to discourage the instrument carried by the platform 66 from falling off of the carrying surface 72 and/or to prevent liquids spilled onto the carrying surface 72 from leaking. The bottom surface 73 is configured to be slidably supported by a pair of sliders or slide rails 79 (FIG. 5) that are fixed relative to the deck frame 46.

In the embodiment shown, a handle 80 is operatively coupled to one of the pillars 74 via a handle bracket 82 having a collar 84 for receiving the handle 80. The handle 80 includes a body portion 86 which provides a gripping point for laboratory personnel to manipulate the platform 66 by exerting a force thereon. In the embodiment shown, the body portion 86 is made of a suitable material, such as glass or plastic, so as to be generally translucent and generally cylindrical in shape, and is coupled to the pillar 74 of the tray 70 in a substantially vertical orientation. In other embodiments, the body portion 86 may be configured and/or coupled to the tray 70 in any other suitable manner or orientation. For example, the body portion 86 may be oriented substantially horizontally.

In one embodiment, either the platform 66 or a fixed portion of the deck 42 may include a controller housing (not shown) for housing a local controller 110 (FIG. 9) dedicated to the platform 66. In one embodiment, the local controller 110 includes a single-board computer having a central processing unit, such as that sold under the trademark Raspberry Pi. The controller housing may be mounted to the bottom surface 73 of the tray 70 such that the controller housing moves with the platform 66, or may be positioned below the bottom surface 73 of the tray 70 and fixed to the deck 42 such that the controller housing does not move with the platform 66. The features of the local controller 110 are discussed in greater detail below. In any event, the tray 70 of the platform 66 may slide relative to the deck frame 46 in a known manner, such as via interaction between the bottom surface 73 and the sliders or slide rails 79.

Figure 4:
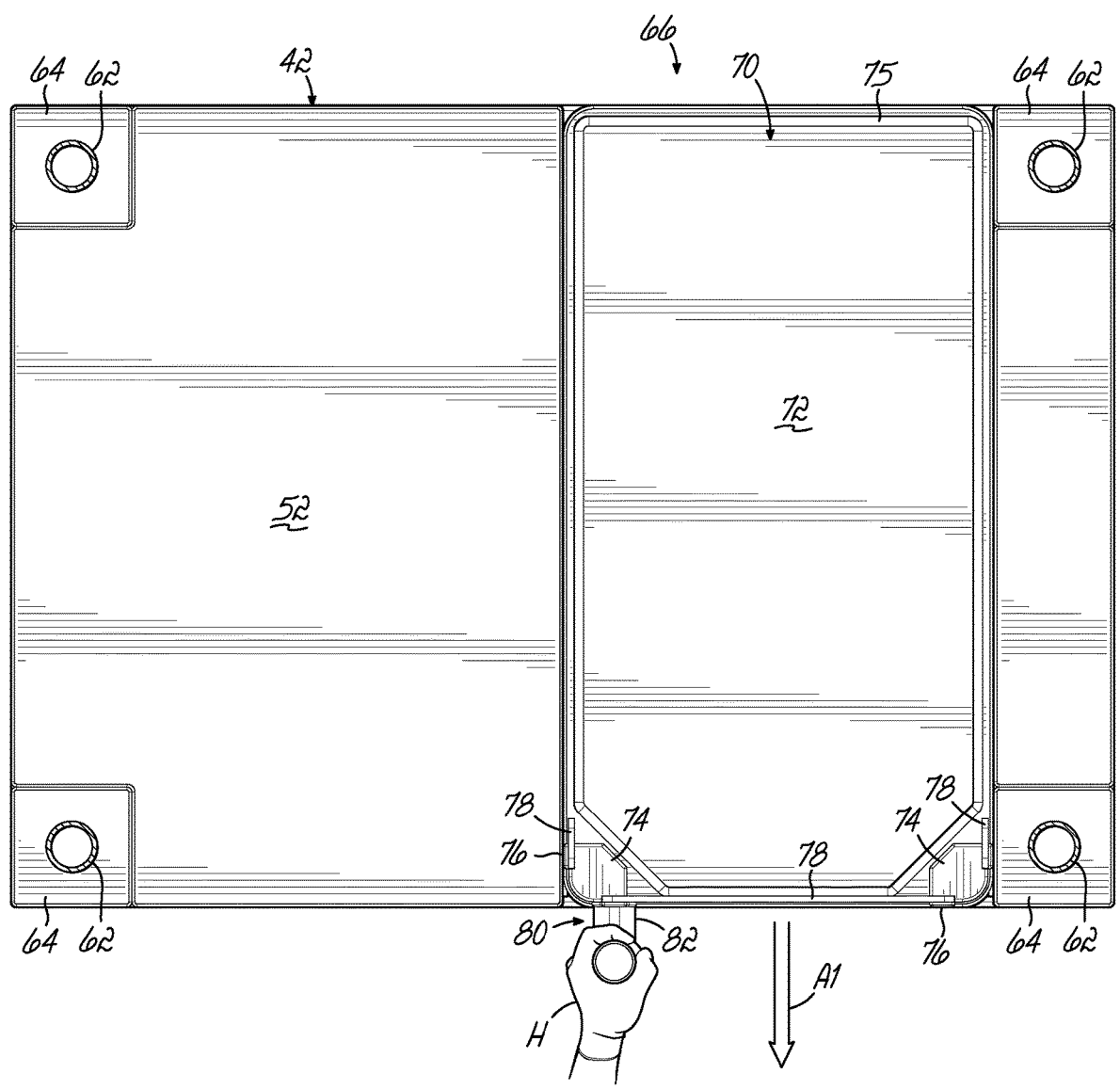
FIG. 4 is a top view of the lower portion of FIG. 3, showing the slidable platform in a docked position.
Figure 5:
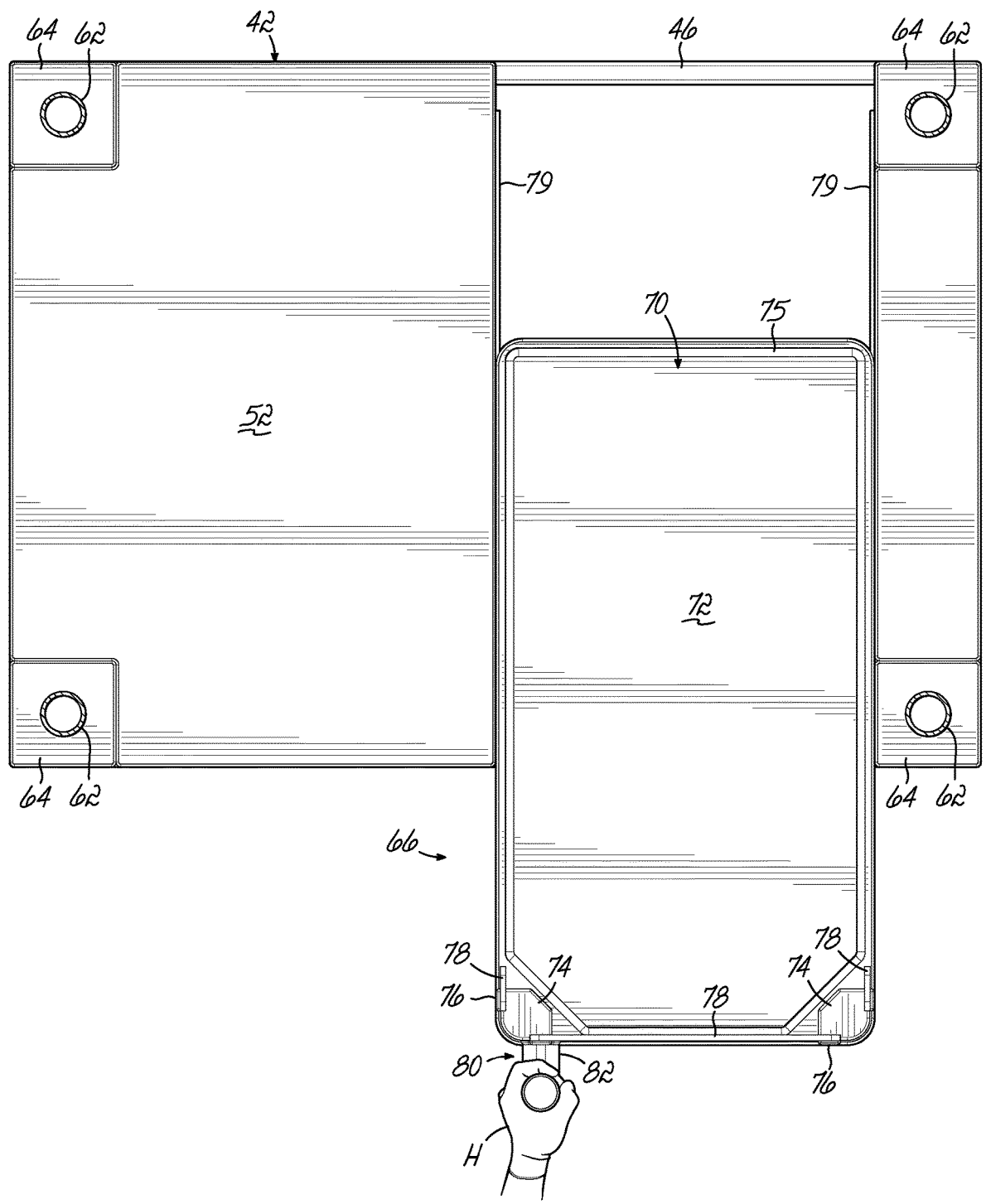
FIG. 5 is a top view similar to FIG. 4, showing the slidable platform in an undocked position.

As best shown in FIGS. 4 and 5, the platform 66 is slidable along the deck frame 46 between a docked position (FIG. 4) and at least one undocked position (FIG. 5). Sliding of the platform 66 between the docked and undocked positions may be achieved by a user gripping and manipulating the handle 80 of the platform 66 via the user's hand H. The illustrated platform 66 is slidable from the docked position to the undocked position in the direction indicated by the arrow A1. The illustrated undocked position is linearly displaced from the docked position by approximately half of the length of the platform 66. The platform 66 may be slid to an undocked position having a greater or less distance of displacement from the docked position. The maximum distance of displacement of an undocked position from the docked position may be limited by an external obstacle and/or by an internal stop (not shown).

In any event, when the platform 66 is in the docked position, the instrument carried by the platform 66 may be readily accessible by the robotic device 14 for use in an assay, for example, and may be substantially inaccessible to laboratory personnel, such as due to the one or more guards 78 providing a barrier between the laboratory personnel and the instrument. When in the undocked position, the instrument carried by the platform 66 may be readily accessible by laboratory personnel and the robotic device 14 may be blocked from accessing the instrument, as discussed in greater detail below. The platform 66 may be individually undocked as needed for providing laboratory personnel access to the particular instrument carried thereon.

In one embodiment, the platform 66 may include a locking mechanism 160 (FIG. 10) for selectively locking the platform 66 against translation relative to the deck frame 46 when in the docked position, such that when the locking mechanism 160 is engaged a user may be unable to slide the platform 66 out of the docked position. Thus, the platform 66 may be both docked and locked. When the locking mechanism 160 is disengaged, the platform 66 may be unlocked and freely slidable relative to the deck frame 46, such that the platform 66 may be slid between the docked and undocked positions. Upon initial disengagement of the locking mechanism 160, the platform 66 may be docked and unlocked. When slid by the user out of the docked position, the platform 66 may be undocked and unlocked. Any suitable configuration of the locking mechanism 160 may be used to selectively lock the platform 66 against translation relative to the deck frame 46.

In one embodiment, the pillars 74 may collectively include at least one power port 162 and at least one data port 164 (FIG. 9) for receiving respective power and data cables (not shown) from the instrument carried by the platform 66. The power port 162 may be configured to receive a power cable from the local controller 110 such that the instrument may be in electrical communication with the local controller 110 to receive power therefrom. In this manner, the power port 162 and power cable may supply electrical power to the instrument, and the local controller 110 may be configured to turn the power supply to the instrument on or off. The data port 164 may be configured to receive at least one data cable, such as a serial data cable. The platform 66 may include one or more passageways and/or conduits for routing the cables to their respective destinations to provide integrated cable management and so that the platform 66 may provide integrated power and communication for the instrument(s) carried thereby.

While the illustrated slidable platform 66 is shown attached to the right-hand side of the left-hand deck 42, it will be appreciated that the slidable platform 66 may be positioned at any other suitable location with respect to any of the decks 40, 42, 44. For example, the illustrated fixed platform 52 on the left-hand side of the left-hand deck 42 may be eliminated and replaced with a second slidable platform (not shown), which may include a handle 80 attached to the right-hand pillar 74 thereof. Alternatively, the slidable platform 66 and/or deck 42 may be resized such that the slidable platform 66 may span substantially the entire width of the deck 42. Various other configurations may be used as may be desired.

Figure 6:
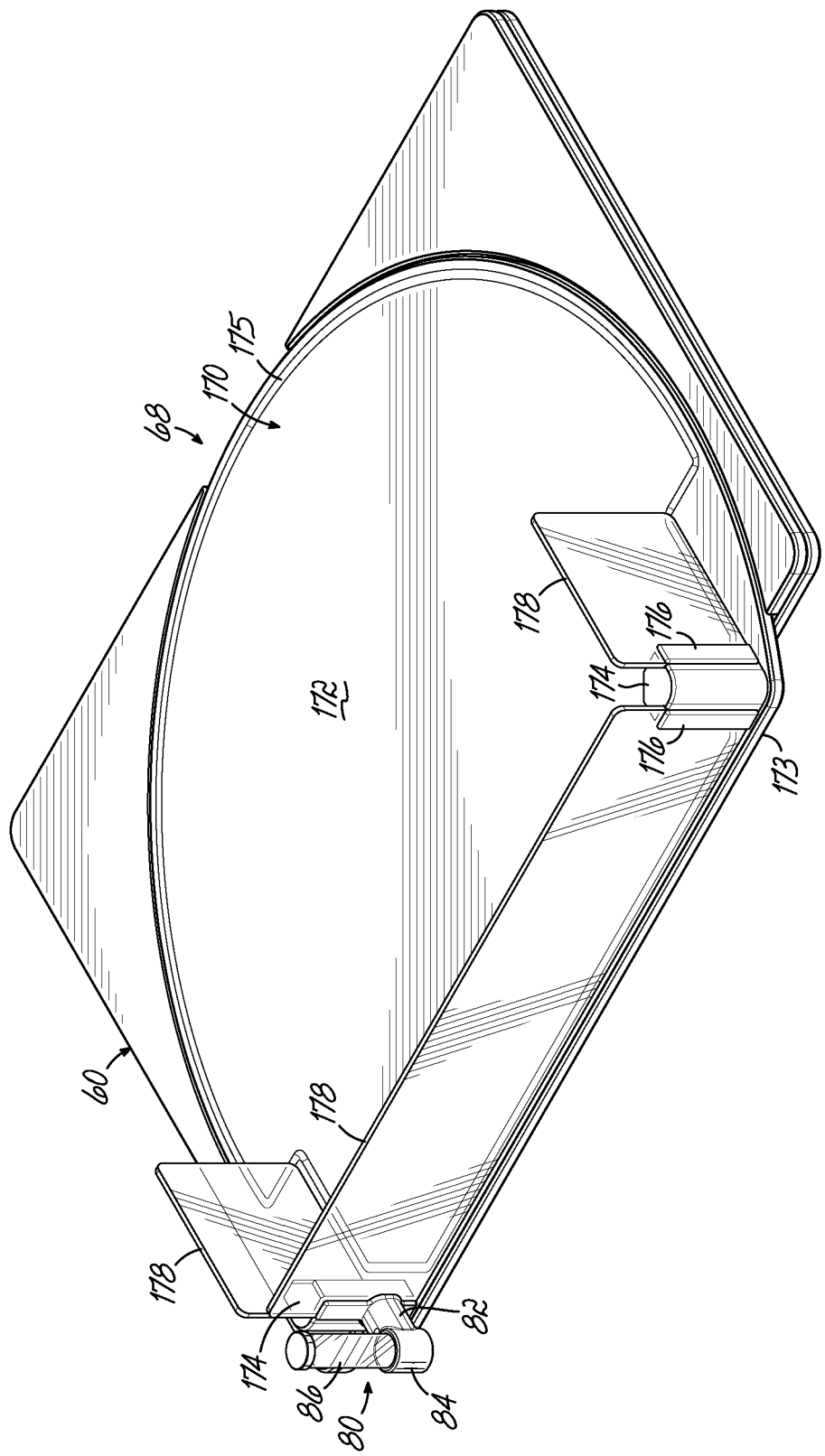
FIG. 6 is a perspective view of an upper portion of the storage system of FIG. 2, showing a rotatable tabletop thereof.

Referring now to FIG. 6, and with continuing reference to FIGS. 1 and 2, the illustrated rotatable tabletop 68 includes a tray 170 for carrying at least one instrument or lab consumable, for example. In this regard, the tray 170 includes a carrying surface 172 for receiving the corresponding instrument and a bottom surface 173 opposite the carrying surface 172. The tray 170 also includes a pair of pillars 174 extending upwardly from the carrying surface 172 at or near the front corners thereof and a spillway 175 extending downwardly from the carrying surface 172 at or near the periphery thereof in order to prevent liquids spilled onto the carrying surface 172 from leaking. The pillars 174 may be configured to support one or more clips or brackets 176 for supporting an object such as one or more guards 178 to provide a barrier at or near the periphery of the carrying surface 172 in order to discourage the instrument carried by the tabletop 68 from falling off of the carrying surface 172 and/or to prevent liquids spilled onto the carrying surface 172 from leaking. The bottom surface 173 is configured to be rotatably supported by a bearing surface, such as a recessed bearing surface 179 (FIG. 8), that is fixed relative to the deck frame 46.

In the embodiment shown, a handle 80 similar in construction to that described above with respect to the slidable platform 66 is operatively coupled to one of the pillars 174 via a handle bracket 82 having a collar 84 for receiving the handle 80. The handle 80 includes a body portion 86 which provides a gripping point for laboratory personnel to manipulate the tabletop 68 by exerting a force thereon. In the embodiment shown, the body portion 86 is made of a suitable material, such as glass or plastic, so as to be generally translucent and generally cylindrical in shape, and is coupled to the pillar 174 of the tray 170 in a substantially vertical orientation. In other embodiments, the body portion 86 may be configured and/or coupled to the tray 170 in any other suitable manner or orientation. For example, the body portion 86 may be oriented substantially horizontally.

In one embodiment, either the tabletop 68 or a fixed portion of the table 60 may include a controller housing (not shown) for housing a local controller 110 (FIG. 9) dedicated to the tabletop 68. In one embodiment, the local controller 110 includes a single-board computer having a central processing unit, such as that sold under the trademark Raspberry Pi. The controller housing may be mounted to the bottom surface 173 of the tray 170 such that the controller housing moves with the tabletop 68, or may be positioned below the bottom surface 173 of the tray 170 and fixed to the table 60 such that the controller housing does not move with the tabletop 68. The features of the local controller 110 are discussed in greater detail below. In any event, the tray 170 of the tabletop 68 may rotate about the central axis of the tabletop 68 in a known manner, such as via interaction between the bottom surface 173 and the bearing surface 179, and/or via interaction between the bottom surface 173, bearing surface 179, and ball bearings (not shown) positioned therebetween.

Figure 7:
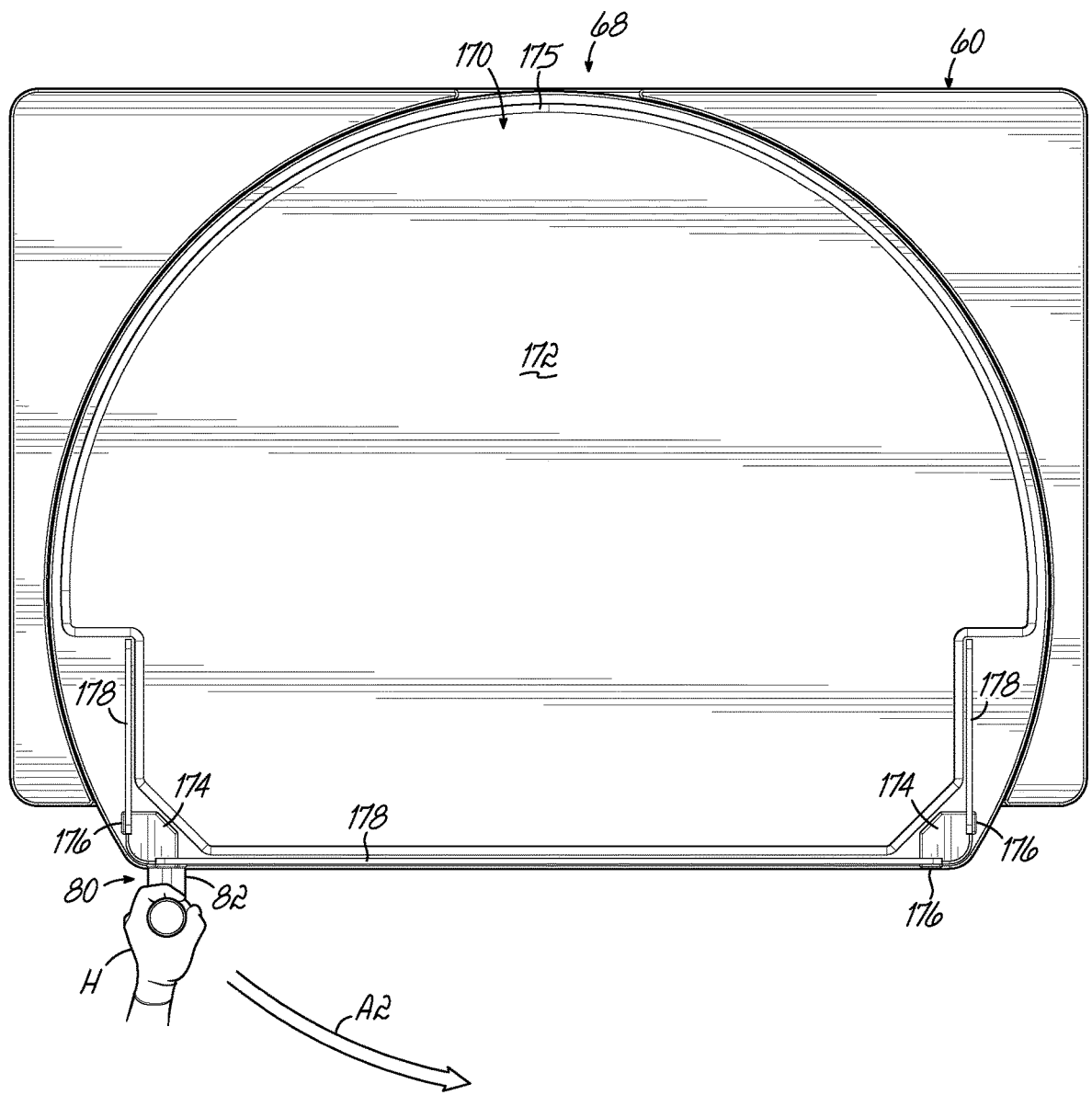
FIG. 7 is a top view of the upper portion of FIG. 6, showing the rotatable tabletop in a docked position.
Figure 8:
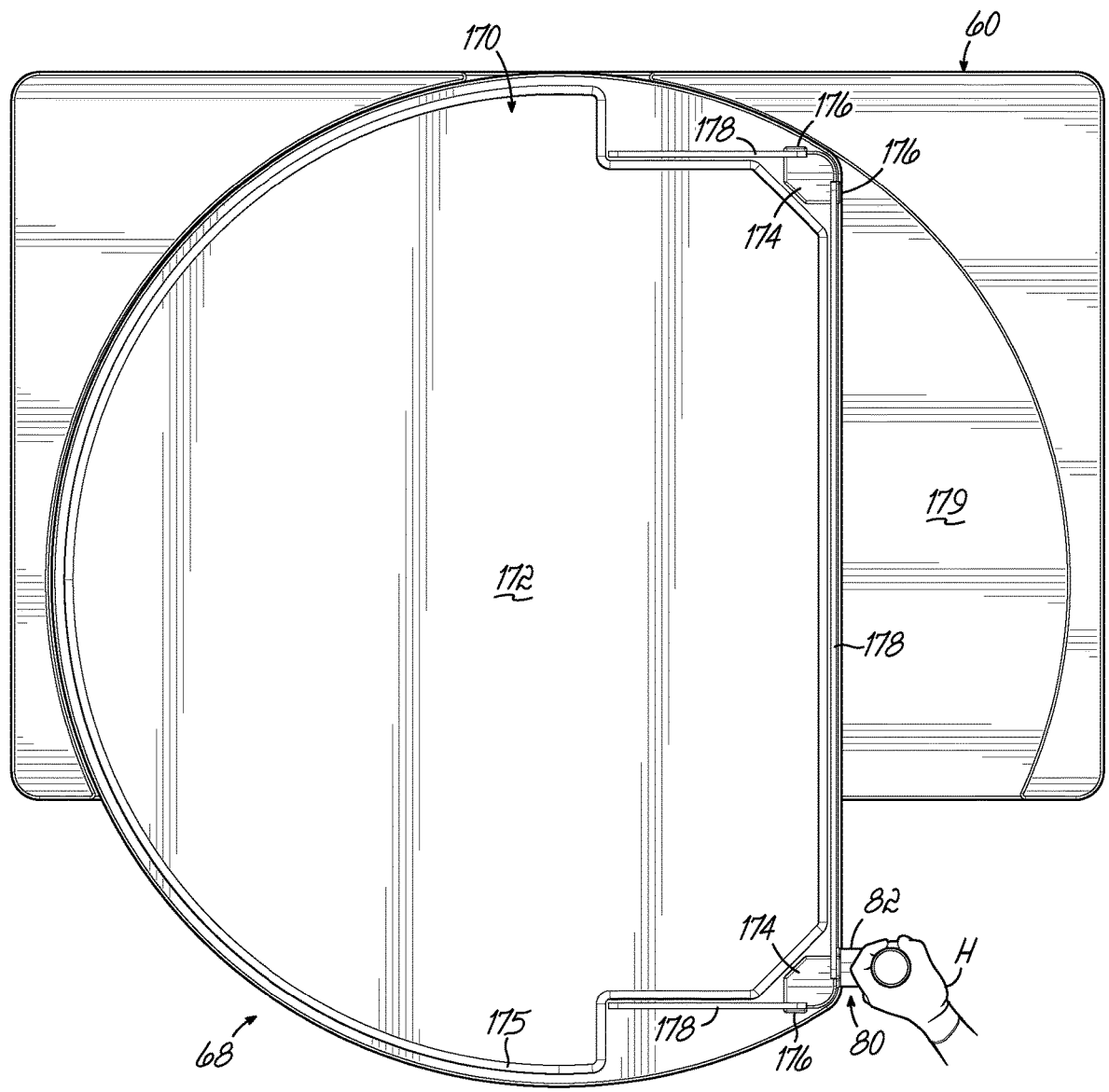
FIG. 8 is a top view similar to FIG. 7, showing the rotatable tabletop in an undocked position.

As best shown in FIGS. 7 and 8, the tabletop 68 is rotatable about its central axis between a docked position (FIG. 7) and at least one undocked position (FIG. 8). Rotation of the tabletop 68 between the docked and undocked positions may be achieved by a user gripping and manipulating the handle 80 of the tabletop 68 via the user's hand H. The illustrated tabletop 68 is positioned on top of the table 60 of the deck 42 with the handle 80 attached to the left-hand pillar 174 and is rotatable from the docked position to the undocked position in a counterclockwise direction, as indicated by the arrow A2. Conversely, a tabletop 68 with the handle 80 attached to the right-hand pillar 174 may be rotatable from the docked position to the undocked position in a clockwise direction (not shown). The illustrated undocked position is angularly displaced from the docked position by approximately 90°. In one embodiment, the tabletop 68 may be rotatable beyond the illustrated undocked position. For example, the tabletop 68 may be rotatable to an undocked position angularly displaced from the docked position by approximately 180°. The tabletop 68 may be rotated to an undocked position having a greater or less angle of displacement from the docked position. The maximum angle of displacement of an undocked position from the docked position may be limited by an external obstacle and/or by an internal stop (not shown).

In any event, when the tabletop 68 is in the docked position, the instrument carried by the tabletop 68 may be readily accessible by the robotic device 14 for use in an assay, for example, and may be substantially inaccessible to laboratory personnel, such as due to the one or more guards 178 providing a barrier between the laboratory personnel and the instrument. When in the undocked position, the instrument carried by the tabletop 68 may be readily accessible by laboratory personnel and the robotic device 14 may be blocked from accessing the instrument, as discussed in greater detail below. The tabletop 68 may be individually undocked as needed for providing laboratory personnel access to the particular instrument carried thereon.

In one embodiment, the tabletop 68 may include a locking mechanism 160 (FIG. 9) for selectively locking the tabletop 68 against rotation about the central axis thereof when in the docked position, such that when the locking mechanism 160 is engaged a user may be unable to rotate the tabletop 68 out of the docked position. Thus, the tabletop 68 may be both docked and locked. When the locking mechanism 160 is disengaged, the tabletop 68 may be unlocked and freely rotatable about the central axis thereof, such that the tabletop 68 may be rotated between the docked and undocked positions. Upon initial disengagement of the locking mechanism 160, the tabletop 68 may be docked and unlocked. When rotated by the user out of the docked position, the tabletop 68 may be undocked and unlocked. Any suitable configuration of the locking mechanism 160 may be used to selectively lock the tabletop 68 against rotation about the central axis thereof.

In one embodiment, the pillars 174 may collectively include at least one power port 162 and at least one data port 164 (FIG. 9) for receiving respective power and data cables (not shown) from the instrument carried by the tabletop 68. The power port 162 may be configured to receive a power cable from the local controller 110 such that the instrument may be in electrical communication with the local controller 110 to receive power therefrom. In this manner, the power port 162 and power cable may supply electrical power to the instrument, and the local controller 110 may be configured to turn the power supply to the instrument on or off. The data port 164 may be configured to receive at least one data cable, such as a serial data cable. The tabletop 68 may include one or more passageways and/or conduits for routing the cables to their respective destinations to provide integrated cable management and so that the tabletop 68 may provide integrated power and communication for the instrument(s) carried thereby.

While the illustrated rotatable tabletop 68 and slidable platform 66 are shown incorporated into the same deck 42, it will be appreciated that these features may be incorporated into separate decks. For example, the rotatable tabletop 68 may be positioned on top of the table 60 of the right-hand deck 44 having only a fixed platform 52 underneath. Likewise, the slidable platform 66 may be attached to the right-hand deck 44 having only a fixed table 60 overtop. Alternatively, the slidable platform 66 may be attached to a deck having no table 60. Various other configurations may be used as may be desired.

Figure 9:
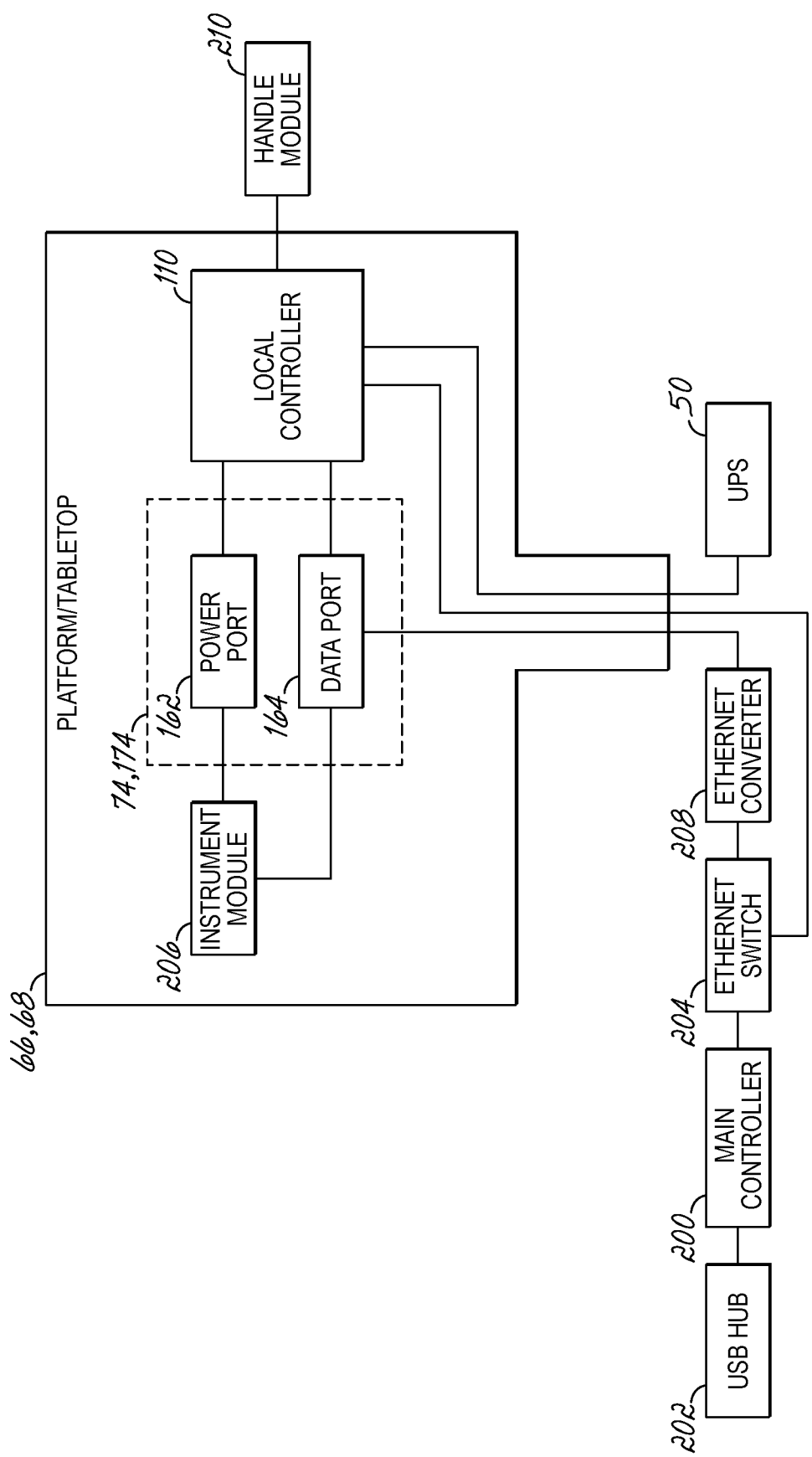
FIG. 9 is a schematic view of an exemplary network for a slidable platform and/or rotatable tabletop in accordance with an embodiment of the present invention.

Referring now to FIG. 9, the automated lab system 10 includes a main controller 200 which may communicate with the local controller(s) 110 and/or the instrument(s) carried by the platform 66 and/or tabletop 68 via a USB hub 202, an Ethernet switch 204, and/or any other suitable channel of communication. In the embodiment shown, the main controller 200 communicates with the local controller(s) 110 via the Ethernet switch 204, and communicates with an instrument module 206 of the instrument via the Ethernet switch 204, an Ethernet converter 208, and the data port 164. One of the uninterruptable power supplies 50 may provide power to the local controller(s) 110. As shown, the local controller(s) 110 may be in communication with a respective handle module 210, discussed in greater detail below. While not shown, the main controller 200 may be in communication with the robotic device 14 in a known manner, such as through a serial connection. Although communications between the main controller 200, the local controllers 110, the instruments, the handle module 210, and/or the robotic device 14 are described as using certain communication protocols, the invention is not so limited. Thus, it should be understood that in alternative embodiments of the invention, communication between the local controllers 110, the main controller 200, the instrument modules 206, the handle modules 210, and/or the robotic device 14 may be configured to use any suitable communication protocol including, but not limited to serial, parallel, and/or wireless protocols.

Figure 10:
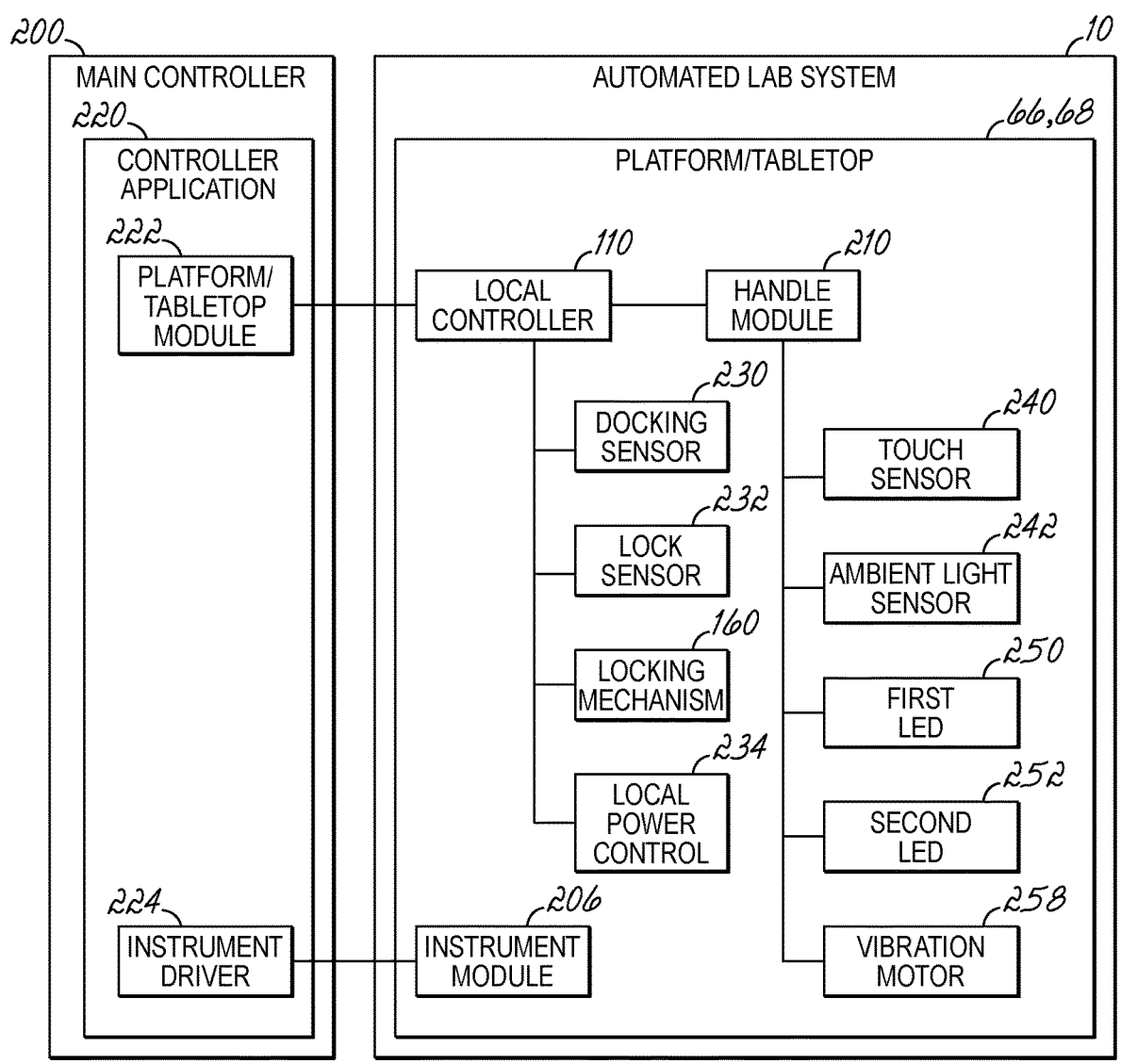
FIG. 10 is a schematic view illustrating communications between the main controller shown in FIG. 9 and other components of the automated lab system.

Referring now to FIG. 10, the exemplary main controller 200 may include a controller application 220 for running a platform/tabletop module 222 and at least one instrument driver 224. The platform/tabletop module 222 is in communication with the local controller 110 for transmitting data therebetween, and the instrument driver 224 is in communication with the instrument module 206 of the instrument carried on the respective platform 66 or tabletop 68 for transmitting data therebetween. In the embodiment shown, a single instrument driver 224 is provided. Additional instrument drivers 224 may be provided, such as in cases where a platform 66 or tabletop 68 carries more than one instrument.

As shown, each local controller 110 is in communication with a docking sensor 230 configured to determine whether the respective platform 66 or tabletop 68 is in the docked position, and is in communication with a lock sensor 232 configured to determine whether the platform 66 or tabletop 68 is locked against movement from the docked position, such that the sensors 230, 232 may notify the local controller 110 of the respective docked and/or locked states of the platform 66 or tabletop 68. In the embodiment shown, each local controller 110 is also in communication with the locking mechanism 160 and, more particularly, with the actuator of the locking mechanism 160 such that the local controller 110 may activate and/or deactivate the actuator or lock release in order to lock and/or unlock the respective platform 66 or tabletop 68. In the embodiment shown, each local controller 110 is further in communication with a local power controller 234 for switching the power supply to the respective platform 66 or tabletop 68.

Each handle module 210 includes at least one sensor for detecting contact or proximity between the body portion 86 of the handle 80 and an object such as a user's hand H. In the exemplary embodiment, each handle module 210 includes a touch sensor 240 and an ambient light sensor 242 which may be positioned in the body portion 86. The touch sensor 240 may be an infrared proximity sensor configured to detect a change in infrared radiation resulting from a user's hand H being positioned around or removed from the body portion 86 of the handle 80. In other embodiments, the handle module 210 may include more than one touch sensor 240 of various suitable types for detecting contact with or proximity to a user's hand H, as may be desired. For example, optical sensors and/or capacitive sensors may be used. As discussed in greater detail below, the touch sensor 240 may receive input from the user to request to unlock the respective platform 66 or tabletop 68, and may receive input from the user indicating whether to wait until the instrument carried by the platform 66 or tabletop 68 is not being used by automation or to unlock the platform 66 or tabletop 68 while being used by automation. The proximity of the handle 80 to the instrument carried by the respective platform 66 or tabletop 68 may assist the user in providing input to the proper handle 80 associated with the target instrument of the automated lab system 10.

As shown, each handle module 210 also includes at least one indicator for providing a discernible indication to a user. More particularly, each handle module 210 includes one or more light sources such as first and second light emitting diodes (LEDs) 250, 252 which may be positioned in the body portion 86. Each of the LEDs 250, 252 may be configured to provide a visual indication to a user. In one embodiment, each of the LEDs 250, 252 may be independently controllable and/or may be multi-colored so as to be capable of emitting multiple colors of light to provide a variety of visual indications. The ambient light sensor 242 may be an optical sensor configured to regulate the intensity of the LEDs 250, 252 in order to provide sufficient and consistent contrast of the lighting of the handle 80 relative to the ambient light levels. In the illustrated embodiment, each handle module 210 further includes a vibration source such as a vibration motor 258 configured to provide a tactile indication to the user. As discussed in greater detail below, the LEDs 250, 252 may indicate whether the instrument carried by the respective platform 66 or tabletop 68 can be used by the user, whether the instrument is needed for automation, or whether the instrument is in an error state. The vibration motor 258 may provide tactile feedback to the user indicating that the user has held the handle module 210, such as the body portion 86 thereof, for a sufficient duration of time to initiate a request or demand for the instrument carried by the respective platform 66 or tabletop 68 to be taken offline, as discussed in greater detail below. The proximity of the handle 80 to the instrument carried by the respective platform 66 or tabletop 68 may assist the user in recognizing the particular instrument of the automated lab system 10 that is the subject of the provided indication.

Figure 11:
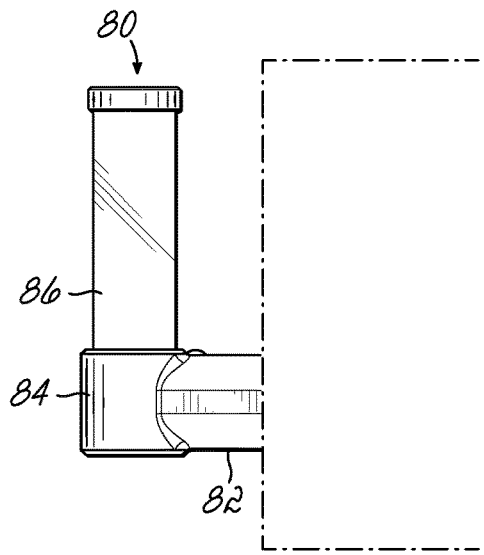
FIG. 11 is a side view of the handle of FIG. 3 and/or FIG. 6, showing the handle in an unilluminated state.
Figure 12:
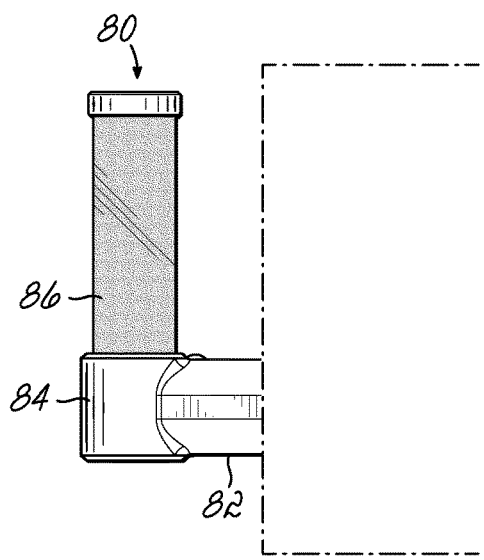
FIG. 12 is a side view similar to FIG. 11, showing the handle in an illuminated state.
Figure 13:
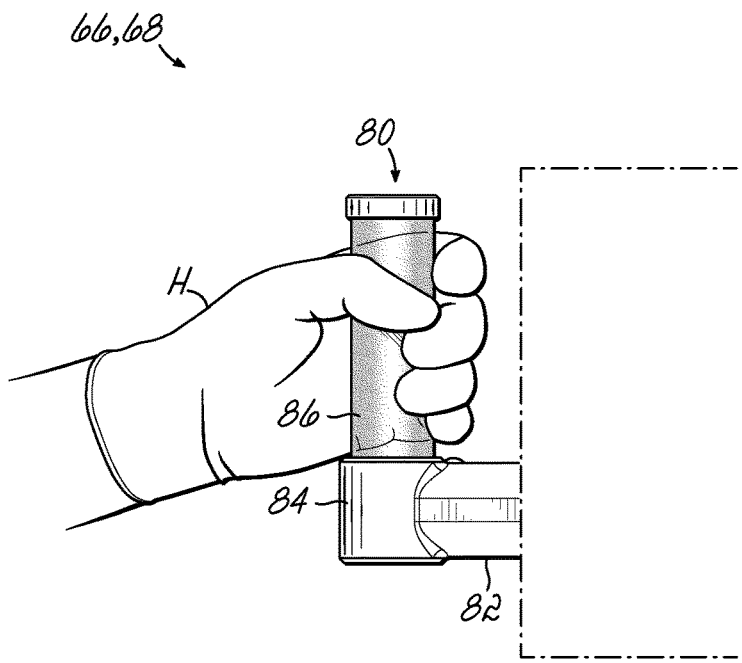
FIG. 13 is a side view similar to FIG. 11, showing the handle in a flashing state.
Figure 14:
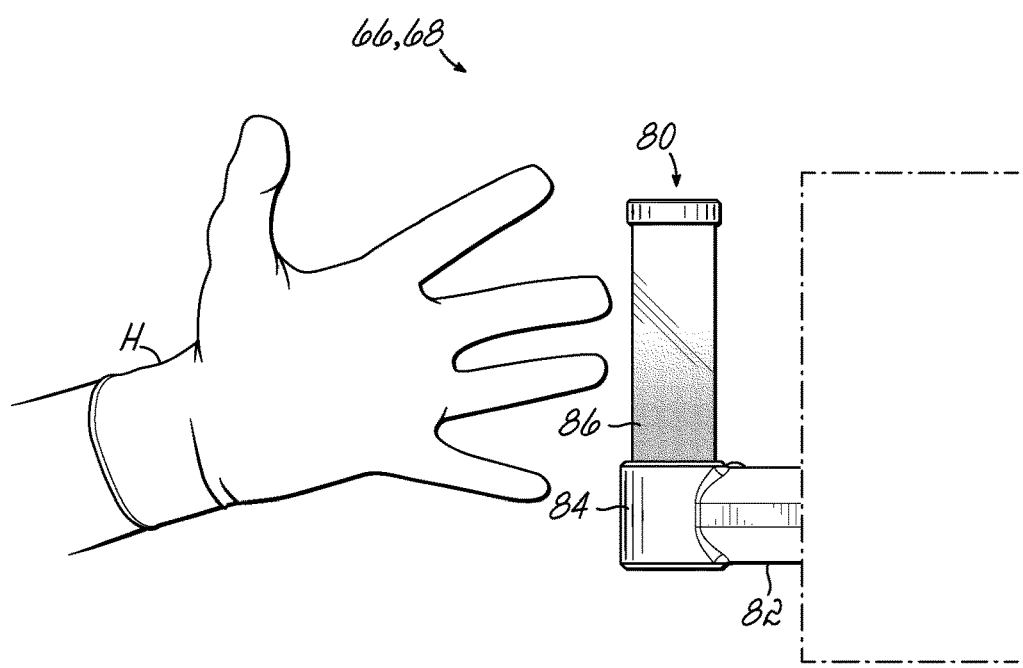
FIG. 14 is a side view similar to FIG. 11, showing the handle in a breathing or gently pulsating state.

Referring now to FIGS. 11-14, the LEDs 250, 252 of the handle 80 may be dormant when the instrument carried on the respective platform 66 or tabletop 68 is not powered, such that the handle 80 is not illuminated (FIG. 11). When powered on, the LEDs 250, 252 may be activated in response to a signal(s) received from the respective local controller 110 by the handle module 210, such that the handle 80 is illuminated (FIG. 12). The handle 80 may be illuminated in a variety of manners to indicate a variety of states of the platform 66 or tabletop 68 and/or instrument(s) carried by the platform 66 or tabletop 68. For example, the handle 80 may be illuminated white to indicate that the instrument is powered but not yet in communication with the main controller 200. The handle 80 may be illuminated blue to indicate that the instrument is in communication with the main controller 200 and ready for automation ("online"). The handle 80 may be illuminated green to indicate that the platform 66 or tabletop 68 is ready for unlocking and/or the instrument is ready for access by a user ("offline"). The handle 80 may be illuminated yellow to indicate a warning state of the instrument and may be illuminated red to indicate an error state of the instrument. The handle 80 may be illuminated in a flashing manner when gripped by a user's hand H to acknowledge the user's input and/or to indicate that the instrument is transitioning between states (FIG. 13) and may be illuminated in a breathing or gently pulsating manner to indicate that the instrument is ready for user handling (FIG. 14). It will be appreciated that the invention is not limited to these exemplary indications. In other embodiments, the various indications provided by the handle 80 may be configured in any suitable manner. For example, a variety of dynamic effects, such as changes in illumination colors, illumination patterns and/or vibrations, may be provided by the LEDs 250, 252 and/or vibration motor 258 to indicate a variety of statuses and/or transitions between statuses of various components of the automated lab system 10.

In one embodiment, the handle module 210 may be configured to send an offline request to the main controller 200, such as via the local controller 110, that the instrument carried by the respective platform 66 or tabletop 68 be taken offline. This may be done in preparation for unlocking the platform 66 or tabletop 68. For example, the request may be triggered by the touch sensor 240 of the handle 80 detecting a relatively short hold of the handle 80 by the user's hand H.

In addition, or alternatively, the handle module 210 may be configured to send a request cancellation to the main controller 200, such as via the local controller 110, cancelling a request to take the instrument carried by the platform 66 or tabletop 68 offline. For example, the request cancellation may be triggered by the touch sensor 240 of the handle 80 detecting a subsequent contact or proximity between the handle 80 and the user's hand H following the short hold.

In addition, or alternatively, the handle module 210 may be configured to send an immediate unlock request to the local controller 110 that the locking mechanism 160 be immediately disengaged so that the platform 66 or tabletop 68 may be moved from the docked position to the undocked position. For example, the immediate unlock request may be triggered by the touch sensor 240 of the handle 80 detecting a relatively long hold of the handle 80 by the user's hand H. The handle module 210 may be configured to acknowledge the relatively long hold of the handle 80 by activating the vibration motor 258 to provide tactile feedback to the user's hand H. The local controller 110 may, in turn, send an offline request to the main controller 200 that the instrument carried by the platform 66 or tabletop 68 be taken offline.

Various exemplary methods of using the handle 80 to interact with the automated lab system 10 are described in co-pending U.S. patent application Ser. No. 16/265,225.

Figure 15:
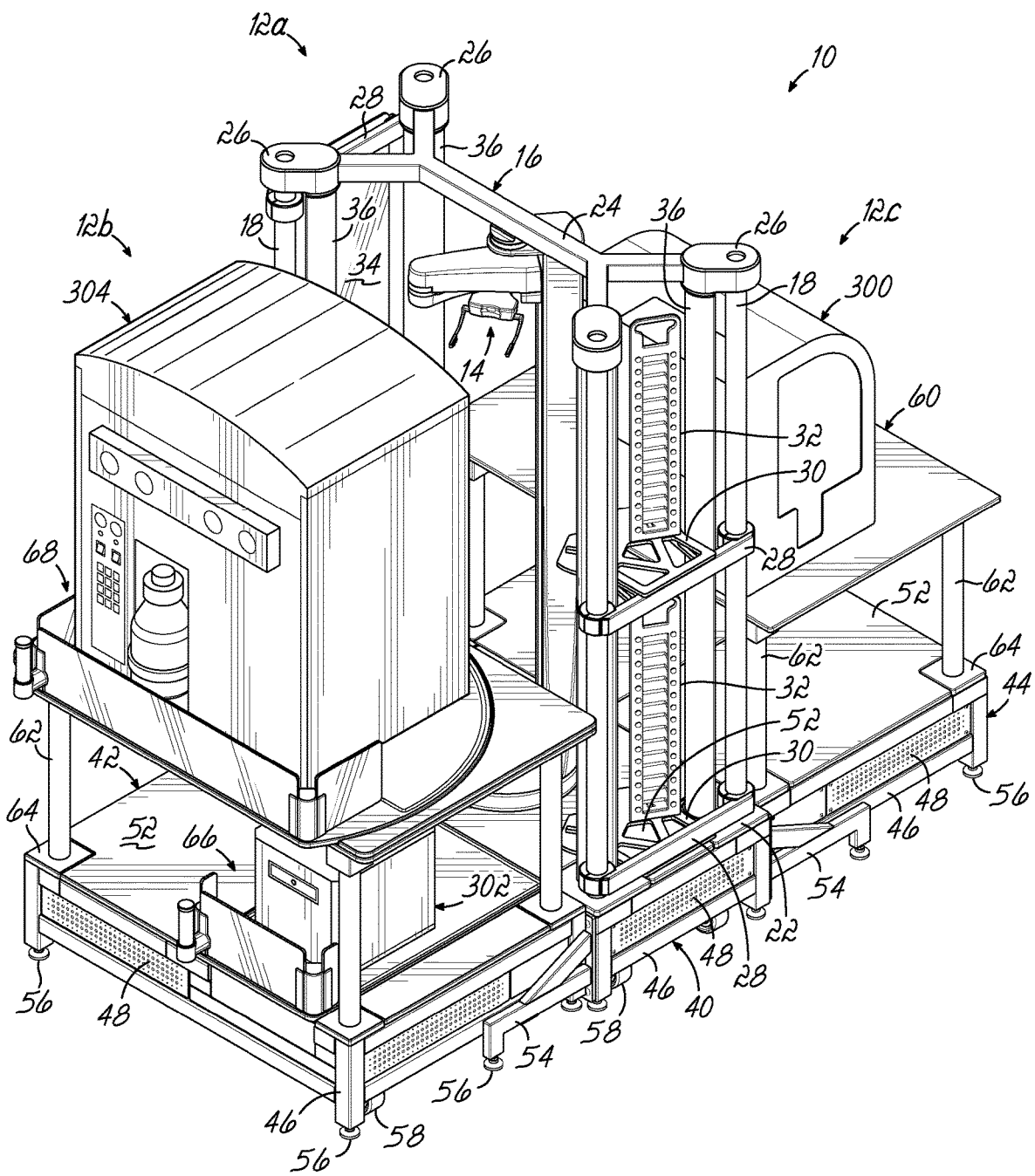
FIG. 15 is a perspective view similar to FIG. 1, showing a variety of instruments positioned on and around the storage system.

Referring now to FIG. 15, in one embodiment, a variety of scientific instruments and, more particularly, a liquid handler 300, a centrifuge 302, and a reagent dispenser 304 are each positioned on or next to the storage systems 12a, 12b, 12c such that the scientific instruments may be accessed by the robotic device 14 for performing a desired assay or procedure.

For example, the illustrated automated lab system may perform a DNA replication procedure. In one embodiment, the robotic device 14 may grip a sample plate (not shown) containing a target DNA and stored on one of the hotels 32, for example, and load the sample plate into the liquid handler 300. The robotic device 14 may also grip a polymerase chain reaction (PCR) plate for replicating the target DNA in and stored on one of the hotels 32, for example, and load the PCR plate into the liquid handler 300. New tips (not shown) for transferring the target DNA to the PCR plate may also be loaded onto the liquid handler 300 from a tip box (not shown) stored on one of the hotels 32, for example, by the robotic device 14. Next, the liquid handler 300 may transfer some of the target DNA from the sample plate as well as the necessary reagents to the PCR plate via the new tips. The robotic device 14 may change out the tips for a different set of new tips and transfer the necessary reagents to the PCR plate via the different set of new tips. The robotic device 14 may then grip the PCR plate and transfer the PCR plate from the liquid handler 300 to a sealer (not shown), positioned on any of the optional shelves or platforms 52, for example, which may seal the openings to the wells in the PCR plate. The robotic device 14 may grip the sample plate and transfer the sample plate from the liquid handler 300 to the centrifuge 302. The tips may be ejected into a receptacle (not shown), which may be gripped by the robotic device 14 and transferred to one of the hotels 32 for storage. After the openings to the wells of the PCR plate have been sealed, the robotic device 14 may grip the PCR plate and transfer the PCR plate from the sealer to a thermocycler (not shown), positioned on any of the optional shelves or platforms 52, for example, whereat the target DNA sample is amplified in the PCR plate through a series of cycles in the thermocycler. The robotic device 14 may then grip a product assay plate (not shown) stored on one of the random access hotels 32, for example, and load the product assay plate into the reagent dispenser 304, which may pre-load the product assay plate with a Tris EDTA buffer ("TE buffer") reagent. Next, the robotic device 14 may grip the product assay plate and transfer the product assay plate to the liquid handler 300. The robotic device 14 may also grip the PCR plate and transfer the PCR plate from the thermocycler to the liquid handler 300, with a new set of tips loaded therein, whereat the amplified DNA may be combined with the TE buffer reagent in the product assay plate. In one embodiment, the robotic device 14 may first transfer the PCR plate to a peeler (not shown) positioned on any of the optional shelves or platforms 52, for example, to unseal the PCR plate so that the liquid handler 300 may aspirate some of the amplified DNA. However, the peeler may be optional as the tips of the liquid handler 300 may be capable of piercing the seal provided on the PCR plate. Next, the robotic device 14 may grip the product assay plate and transfer the product assay plate from the liquid handler 300 to a microplate spectrophotometer (not shown), positioned on any of the optional shelves or platforms 52, for example, to verify amplification of the DNA and to determine the quantity. The robotic device 14 may grip the PCR plate and transfer the PCR plate from the liquid handler 300 to the centrifuge 302. The robotic device may grip the product assay plate and transfer the product assay plate from the spectrophotometer to one of the hotels 32 for storage. The robotic device 14 may also grip the used tips and transfer the used tips to one of the hotels for 32 storage.

While the automated lab system 10 has been described as performing a DNA replication procedure via particular instruments and steps, any combination of suitable scientific instruments or lab consumables may be positioned on or next to the storage systems 12a, 12b, 12c for access by the robotic device 14 to perform any desired assay or procedure. In one embodiment, the robotic device 14 may be eliminated, and the assay or procedure may be performed manually or via one or more electromechanical devices directly incorporated into one or more of the scientific instruments, storage units, or other features of the automated lab system 10, for example.

Another example embodiment using the automated lab system 10 with a similar set of instruments on the slidable platforms 66, rotatable tabletops 68, and/or floor of the laboratory standing within reach of the robotic device 14, could be used to perform a wide range of simultaneous automated biochemical assays for drug characterization (not shown). Namely a system including automated devices supporting the various steps needed to complete the sample preparation through to analysis, such as a sealer, peeler, reagent dispensers, an incubator, plate shakers, a liquid handler, a washer and a centrifuge could perform a wide range of assays on the same automated lab system 10. Such a flexible system would be suitable for determining compound solubility, Log D, intrinsic clearance, biochemical stability, and permeability on a large number of samples simultaneously.

While the handle 80 has been described for use with slidable platforms 66 and rotatable tabletops 68, it will be appreciated that the handle 80 may be used with permanently fixed platforms and tabletops. In such cases, the handle may be used for communicating an offline request, for example.

Figure 16:
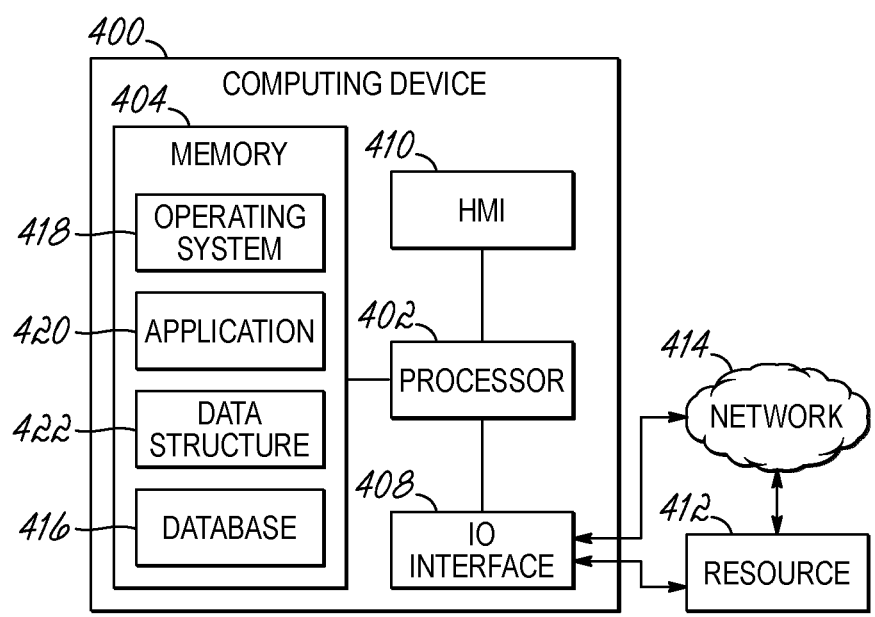
FIG. 16 is a schematic diagram of a computing device in communication with a network and resources in accordance with an aspect of the present invention.

Referring now to FIG. 16, the embodiments of the invention described above may be implemented using one or more computer devices or systems, such as exemplary computer system 400. The computer system 400 may include a processor 402, a memory 404, a mass storage memory device (not shown), an input/output (I/O) interface 408, and a user interface 410. The computer system 400 may also be operatively coupled to one or more external resources 412 via the I/O interface 408 and/or a network 414.

In one embodiment, the computer system 400 may be configured to operate the Momentum software commercially available from Thermo Fisher Scientific, Inc. for providing parallel or sequential processing operations using the automated laboratory system 10 of the present invention. Such software may enable standardized real-time, data-driven decision making that eliminates customized data handling, and may allow a user to define, execute and monitor complex processes in a powerful yet easy-to-use visual environment. Such software may also enable multiple workflows via real-time, data-driven decision-making, and may enable a user to specify the design, configuration and operation of their individual system and plug-in different schedulers to support a broad range of processes and workflows.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 404. Memory 404 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The mass storage memory device 406 may include data storage devices such as a hard drive, optical drive, tape drive, non-volatile solid state device, or any other device capable of storing information. A database 416 may reside on the mass storage memory device 406, and may be used to collect and organize data used by the various systems and modules described herein.

Processor 402 may operate under the control of an operating system 418 that resides in memory 404. The operating system 418 may manage computer resources so that computer program code embodied as one or more computer software applications, such as application 420 residing in memory 404 may have instructions executed by the processor 402. In an alternative embodiment, the processor 402 may execute the applications 420 directly, in which case the operating system 418 may be omitted. One or more data structures 422 may also reside in memory 404, and may be used by the processor 402, operating system 418, and/or application 420 to store or manipulate data.

The I/O interface 408 may provide a machine interface that operatively couples the processor 402 to other devices and systems, such as the network 414 and/or external resource 412. The application 420 may thereby work cooperatively with the network 414 and/or external resource 412 by communicating via the I/O interface 408 to provide the various features, functions, and/or modules comprising embodiments of the invention. The application 420 may also have program code that is executed by one or more external resources 412, or otherwise rely on functions and/or signals provided by other system or network components external to the computer system 400. Indeed, given the nearly endless hardware and software configurations possible, persons having ordinary skill in the art will understand that embodiments of the invention may include applications that are located externally to the computer system 400, distributed among multiple computers or other external resources 412, or provided by computing resources (hardware and software) that are provided as a service over the network 414, such as a cloud computing service.

The user interface 410 may be operatively coupled to the processor 402 of computer system 400 in a known manner to allow a user to interact directly with the computer system 400. The user interface 410 may include video and/or alphanumeric displays, a touch screen, a speaker, and any other suitable audio and visual indicators capable of providing information to the user. The user interface 410 may also include input devices and controls such as an alphanumeric keyboard, a pointing device, keypads, pushbuttons, control knobs, microphones, etc., capable of accepting commands or input from the user and transmitting the entered input to the processor 402.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The present invention in its broader aspects is therefore not limited to the specific details and illustrative examples shown and described. Accordingly, departures may be made from such details without departing from the scope of the general inventive concept.

What is claimed is:

1. An automated laboratory system, comprising:
   a table assembly including a first tabletop portion and a second tabletop portion, the second tabletop portion configured to rotate relative the first tabletop portion between a first position and a second position, the second tabletop portion configured to support an instrument;
   a locking assembly operably connected to the second tabletop portion, the locking assembly having a locked state and an unlocked state, wherein in the locked state, the second tabletop portion is restricted from rotating relative to the first tabletop portion, and wherein in the unlocked state, the second tabletop portion is configured to rotate relative to the first tabletop portion;
   a handle coupled to the second tabletop portion, the handle including a sensor, the sensor configured to detect a user engagement with the handle; and
   a controller operably connected to the sensor and the locking assembly, the controller configured to transition the locking assembly from the locked state to the unlocked state in response to the sensor detecting the user engagement with the handle.

2. The automated laboratory system of claim 1, wherein the sensor includes a contact.

3. The automated laboratory system of claim 1, wherein the instrument is in operable communication with the controller, and wherein the handle includes a light source in communication with the controller, the light source configured to illuminate a first color in response to the instrument being in an online status, and the light source configured to illuminate a second color in response to the instrument being in an offline status.

4. The automated laboratory system of claim 1, wherein the sensor includes a proximity sensor.

5. The automated laboratory system of claim 4, wherein the proximity sensor is an infrared proximity sensor.

6. The automated laboratory system of claim 1, further comprising a robotic device operably positioned relative to the table assembly, the robotic device configured to engage the instrument supported by the second tabletop portion.

7. The automated laboratory system of claim 6, wherein the main controller is in operative communication with the robotic device.

8. The automated laboratory system of claim 6, wherein the robotic device is configured to operate the instrument supported by the second tabletop portion.

9. The automated laboratory system of claim 1, wherein the controller is configured to transition the locking assembly from the locked state to the unlocked state in response to the sensor detecting the user engagement for a predetermined duration of time.

10. The automated laboratory system of claim 9, wherein the instrument is in operable communication with the controller, and wherein in response to the sensor detecting the user engagement for the predetermined duration of time, the controller transitions the instrument to an offline configuration.

11. The automated laboratory system of claim 1, wherein the instrument is in operable communication with the controller, the handle includes a light source in communication with the controller, wherein in response to the sensor detecting the user engagement for a predetermined duration of time, the controller transitions the instrument to an offline configuration and illuminates the light source to emit a light of a first color.

12. The automated laboratory system of claim 11, wherein the handle includes a vibration source, and wherein in response to the sensor detecting the user engagement for the predetermined duration of time, the controller operates the vibration source.

13. The automated laboratory system of claim 1, the handle includes a light source in communication with the controller, the light source configured to emit a light in response to the locking assembly being in the locked state.

14. The automated laboratory system of claim 1, wherein the instrument is in operable communication with the controller, and wherein the handle includes a light source in communication with the controller, the light source configured to emit a light of a first color in response to the instrument being in an offline configuration.

15. The automated laboratory system of claim 14, wherein the light source is configured to emit a light of a second color in response to the instrument being in an error configuration.

16. The automated laboratory system of claim 15, wherein the light source is configured to emit a light of a third color in response to the instrument being in a warning configuration.

17. The automated laboratory system of claim 1, wherein the table assembly is a first table assembly, and further comprising:
a second table assembly vertically offset from the first table assembly, the first and second table assemblies supported by a plurality of table posts, the second table assembly including a third tabletop portion and a fourth tabletop portion, the fourth tabletop portion configured to slide relative to the third tabletop portion, the fourth tabletop portion configured to support a second instrument.

18. The automated laboratory system of claim 17, the second table assembly further comprising:
a second locking assembly operably connected to the fourth tabletop portion, the second locking assembly having a locked state and an unlocked state, wherein in the locked state, the fourth tabletop portion is restricted from sliding relative to the third tabletop portion, and wherein in the unlocked state, the fourth tabletop portion is configured to slide relative to the third tabletop portion;
a second handle coupled to the fourth tabletop portion, the handle including a second sensor, the second sensor configured to detect a user engagement with the second handle; and
the controller operably connected to the second sensor and the second locking assembly, the controller configured to transition the second locking assembly from the locked state to the unlocked state in response to the sensor detecting the user engagement with the handle.

19. The automated laboratory system of claim 1, wherein the second tabletop portion includes a guard panel positioned between the handle and the instrument.

20. The automated laboratory system of claim 1, wherein the second tabletop portion is configured to rotate relative the first tabletop portion around an axis, the axis positioned within the table assembly.

* * * * *

UNITED STATES PATENT AND TRADEMARK OFFICE
CERTIFICATE OF CORRECTION

| | |
|---|---|
| PATENT NO. | : 11,760,571 B2 |
| APPLICATION NO. | : 16/523329 |
| DATED | : September 19, 2023 |
| INVENTOR(S) | : Michael Paul Riff et al. |

It is certified that error appears in the above-identified patent and that said Letters Patent is hereby corrected as shown below:

In the Claims

Claim 2, Line 2 (or Column 16, Line 57), the text "the sensor includes a contact." should be changed to --the sensor includes a contact sensor.--.

Claim 7, Line 2 (or Column 17, Line 8), the text "the main controller is in operative communication with the" should be changed to --the controller is in operative communication with the--.

Signed and Sealed this
Seventh Day of November, 2023

Katherine Kelly Vidal
*Director of the United States Patent and Trademark Office*